(12) United States Patent
Hochstein

(10) Patent No.: US 6,207,967 B1
(45) Date of Patent: Mar. 27, 2001

(54) OFF THE GLASS IMAGING RAIN SENSOR

(75) Inventor: Peter A. Hochstein, Troy, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 09/262,411

(22) Filed: Mar. 4, 1999

(51) Int. Cl.$^7$ .............. G01N 15/06; H01L 27/00; G02B 6/42
(52) U.S. Cl. .............. 250/574; 250/208.1; 250/227.25; 250/214 AL; 250/341.8; 356/448
(58) Field of Search .............. 250/227.25, 214 AL, 250/341.8, 339.11, 573, 574; 356/448

(56) References Cited

U.S. PATENT DOCUMENTS

| | | | |
|---|---|---|---|
| 4,476,419 | | 10/1984 | Fukatsu et al. .............. 318/444 |
| 4,595,866 | | 6/1986 | Fukatsu et al. .............. 318/444 |
| 4,636,643 | | 1/1987 | Nakamura et al. .............. 250/338 |
| 4,652,745 | * | 3/1987 | Zanardelli .............. 250/227.25 |
| 4,676,638 | | 6/1987 | Yasuda .............. 356/237 |
| 4,703,237 | * | 10/1987 | Hochstein .............. 318/483 |
| 4,798,956 | * | 1/1989 | Hochstein .............. 250/341.8 |
| 4,859,867 | * | 8/1989 | Larson et al. .............. 307/10.1 |
| 4,867,561 | * | 9/1989 | Fujii et al. .............. 356/239.8 |
| 4,871,917 | * | 10/1989 | O'Farrell et al. .............. 250/341.7 |
| 4,960,996 | * | 10/1990 | Hochstein .............. 250/349 |
| 4,973,844 | * | 11/1990 | O'Farrell et al. .............. 250/341.7 |
| 5,262,640 | * | 11/1993 | Purvis et al. .............. 250/227.25 |
| 5,278,425 | * | 1/1994 | Bendicks .............. 250/574 |
| 5,313,072 | * | 5/1994 | Vachss .............. 250/573 |
| 5,386,111 | * | 1/1995 | Zimmerman .............. 250/227.25 |
| 5,414,257 | * | 5/1995 | Stanton .............. 250/227.25 |
| 5,537,003 | * | 7/1996 | Bechtel et al. .............. 315/82 |
| 5,661,303 | * | 8/1997 | Teder .............. 250/341.8 |
| 5,898,183 | * | 4/1999 | Teder .............. 250/574 |
| 5,923,027 | * | 7/1999 | Stam et al. .............. 250/208.1 |
| 6,078,056 | * | 6/2000 | Teder .............. 250/574 |
| 6,097,024 | * | 8/2000 | Stam et al. .............. 250/208.1 |

* cited by examiner

Primary Examiner—Georgia Epps
Assistant Examiner—Evelyn A. Lester
(74) Attorney, Agent, or Firm—Howard & Howard

(57) ABSTRACT

An assembly (10) for sensing moisture (20) on the exterior surface (22) of a windshield (14) from a position spaced from the interior surface (18) of the windshield (14). The assembly (10) includes a focal plane detector (12) comprising a plurality of pixels (24) adapted for disposition in spaced relationship to the interior surface (18) of the sheet of glass (14), as on the backside of the rearview mirror. An imaging lens (16) is adapted for disposition between the focal plane detector (12) and the interior surface (18) of the sheet of glass (14) for directing light rays from moisture (20) on the exterior surface (22) of the sheet of glass (14) through the imaging lens (16) to produce a real image of the moisture (20) on said focal plane detector (12). A processing circuit (28) establishes a steady-state level of analog signals (26) representing a non-moisture (20) condition of the exterior surface (22) of the glass (14) and scans the analog signals (26) and analyzes the data to produce a wiper signal (30) in response to a deviation from the steady-state level. The processing circuit (28) also changes the steady-state level in response to permanent changes, e.g., scratches, in the non-moisture (20) condition of the exterior surface (22) of the glass (14). For use in the absence of daytime light, a light source (32) is adapted for disposition in spaced relationship to the interior surface (18) of the sheet of glass (14) for directing light to the exterior surface (22) of the glass (14) whereby light rays generated by the light source (32) are directed from moisture (20) on the exterior surface (22) of the sheet of glass (14) through said imaging lens (16) to produce the real image of the moisture (20) on said focal plane detector (12).

19 Claims, 2 Drawing Sheets

OFF THE GLASS IMAGING RAIN SENSOR

BACKGROUND OF THE INVENTION

1. Field of the Invention

The subject invention relates to an assembly for sensing moisture on a sheet of glass and, more particularly, to a rain sensor for detecting rain on the windshield of an automotive vehicle to turn on the wipers.

2. Description of the Prior Art

The sensing of rain or moisture on the windshield of a vehicle for automatically controlling wiping systems has become a popular driver convenience item in the last several years. With such automation, drivers can be more focused on the road than on the manual setting of the windshield wiper controls. Traditional wiper controls are typically preset to one of several speeds, and/or the wipe rate interval is set according to the rainfall rate. Of course as the rainfall (rate) increases or decreases the proper setting to maintain a nominally clear windshield varies, and, therefore, necessitates frequent driver adjustment.

Such fully automatic, rain sensing, wiper control systems continually monitor the rain that is falling on the windshield, and respond by adjusting the wiping interval to match the rain-fall rate.

Several methods have been used to achieve such automatic wiper control and, for the most part, such methods differ only in the rain sensing detectors that are employed. That is, the rain sensing element is generally adapted to work with or control existing interval (timed) wiping systems. The most common rain or moisture sensing detectors have been based on either the optical or the electrical properties of water.

The electrical rain sensors were used in many of the early automatic wiping systems and in general sense the presence of rain droplets on the outer surface of the windshield by resistive or capacitive means.

The resistive sensors usually employ a conductive detecting grid or interleaved electrodes plated onto the glass surface. The small gaps in such sensing arrays are bridged by water drops to trigger the wiping mechanism. The partly conducting nature of rain water renders such sensors very sensitive, but the problems related to the attachment of the sensor electrodes to the windshield have not been successfully resolved. Furthermore, the slight difference in surface smoothness and surface tension between the electrode material and the surrounding glass has been shown to interfere with wiping efficiency. The life of the electrode has also been a problem with such exterior sensors, as the rubber wiper blades can be quite abrasive if they become loaded with road grime.

The capacitive sensors such as those typified by U.S. Pat. No. 4,703,237 permit the sensing electrodes to be positioned on the inside surface of the windshield while retaining small droplet sensitivity. A limitation of such sensors is that they utilize the high dielectric constant (80) of water to detune a bridge or resonant circuit which requires the sensing electrode (array) to be relatively large to provide the requisite sensitivity. The disposition of suitably large structures on the windshield may interfere with driver vision and are not aesthetically acceptable to the industry.

Optical sensors of various types have gained favor in recent years, but in general suffer from the same limitations as the electrical sensing systems. Conventional optical rain sensors commonly work on the extinction principle, and are designed to be attached to the inside surface of the windshield. Typical of such devices is the rain sensor described in U.S. Pat. No. 4,960,996. The primary reason that such optical sensors have not been totally successful is that they are restricted to sensing a small area of the windshield, generally within the wiped field. Restricting the field of view to a few square inches of glass area has been shown to present problems in certain rain situations. For example, fine and evenly dispersed droplets are easily sensed, but large rain drops with a mean spacing of several inches are not always detected by such small area sensors. That is, if one or more droplets do not fall within the small sensing area of such optical detectors, the device will obviously not trigger the wipers. Increasing the viewing area of traditional optical rain sensors is not practical, because as noted, these devices are invariably designed for "on glass" mounting. As in the case of electrical sensors, enlarging the sensor to monitor a physically larger area of the glass is impractical because of the intrusive nature of such hardware.

Another class of optical rain sensor which does allow for off the glass mounting, and a greater field of view, is based on the back-scatter principle. These sensors aim one or more light sources at the outer windshield surface through the glass and detect the amount of radiation back-scattered toward one or more electro-optic detectors. Rapid changes in ambient lighting conditions often confuse such sensors as do moving patterns of light or shadows that fall on the windshield. Rain sensors based on diffuse back scatter light are typified by U.S. Pat. Nos. 5,673,744, 5,416,318 and 5,264,691.

Virtually all existing rain sensors are prone to false trigger and initiate "phantom wipes" that can be annoying or distracting to the driver. Such false triggering may be due to a variety of reasons but is most often due to dirt on the windshield which may mimic rain for the sensor, or by moving light patterns as noted above. Also, existing optical rain sensors are often overly sensitive to excessive ambient light intensity which may saturate the detectors and under some circumstances, desensitize the detector to rain drops.

The U.S. Pat. No. 4,867,561 to Fujii, et al, discloses an imaging rain sensor, i.e., that, a multi element extinction rain sensor. As noted in this patent, the total reflection from the outer surface of the windshield is reduced by the presence of water drops, as they couple light energy out of the glass. The use of a collimating lens allows the glass reflection to be location specific. The use of first and second light sources, coupled with first and second detectors, is necessary to compensate for ambient light variations. That is, certain photo detector elements are relegated to certain or different functions. In order to achieve the requisite alignment for the extinction principle to work properly, the illumination sources have to be carefully positioned relative to the windshield and the detector, as described in Col. 6, lines 44–65 of the Fujii '561 patent. This critical alignment requirement necessitates mounting the detector assembly close to or in actual contact with the windshield and such close mounting limits the effective field or area of view. The successful implementation of a large area rain sensor based on the extinction principle would require a large linear array of I.R. emitting diodes to effectively illuminate the sensing field.

Experiments in human factors with artificial rain making equipment have been used to determine the optimal wiping intervals and rain [trigger] sensitivity of fully automatic rain sensors. One aspect of these experiments established the minimum useful area for a rain sensor, or the smallest area on the windshield that could be monitored by the active rain sensing element. The importance of this "area parameter" is generally not widely recognized, but is intuitively obvious upon careful analysis. Small rain droplets [and mist] are generally evenly and densely distributed over the windshield, while larger drops may be much more widely spaced and at least locally, not evenly distributed. That is, a relatively small observation or sensing area may not allow a rain detector to trigger on larger water droplets, e.g., a mean spacing greater than 50 mm. Existing 'on the glass' rain sensors are generally limited to measuring areas of under 500 mm squared because larger sensing areas, which require bulkier housings, become physically intrusive and thereby tend to obscure critical portions of the windshield. The human factors experiments suggest that an optimal active sensing area of greater than 6500 mm squared would be required to accommodate all rain conditions and driver expectations. Naturally, attaching a sensor of 50 mm×130 mm [nom. 2 in.×5 in.] to the windshield is impractical, and particularly so when the sensor needs to be located within the wiped portion of the glass.

This paradox of needing to examine a substantial area on the glass for incidence of rain, while at the same time disallowing the attachment of physically large sensors to the glass presents a problem to be solved by a rain sensor.

SUMMARY OF THE INVENTION AND ADVANTAGES

An assembly for sensing moisture on a glass surface from a position spaced from the glass wherein a focal plane detector is adapted for disposition in spaced relationship to the interior surface of the sheet of glass and an imaging lens is adapted for disposition between the focal plane detector and the interior surface of the sheet of glass for directing light rays from moisture on the exterior surface of the sheet of glass through the imaging lens to produce a real image of the moisture on the focal plane detector.

Accordingly, the invention provides a method for sensing moisture on the exterior surface of a sheet of glass comprising the steps of positioning an imaging lens in spaced relationship to the interior surface of the sheet of glass, passing light rays from moisture on the exterior surface of the sheet of glass through the imaging lens and producing a real image of the moisture on the glass, and directing the real image from the lens onto a focal plane detector.

The use of imaging optics to create a real image of a section of the windshield on a focal plane array detector, i.e., camera, permits the remote mounting of the rain sensor, in an unobtrusive location. Several important issues relating to illumination, small droplet sensitivity, observed area and droplet recognition are resolved to provide a practical off the glass rain sensor. The present invention addresses the inadequacies of the prior art and establishes a new level of performance for rain sensing detectors. Unlike the prior art which senses rain drops by measuring the physical, electrical or optical properties of water drops, the present invention mimics human vision. In principle, the present invention behaves much like a human eye and brain, discriminating water drops in a given field, using the unique imaging properties of water drops on a windshield.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
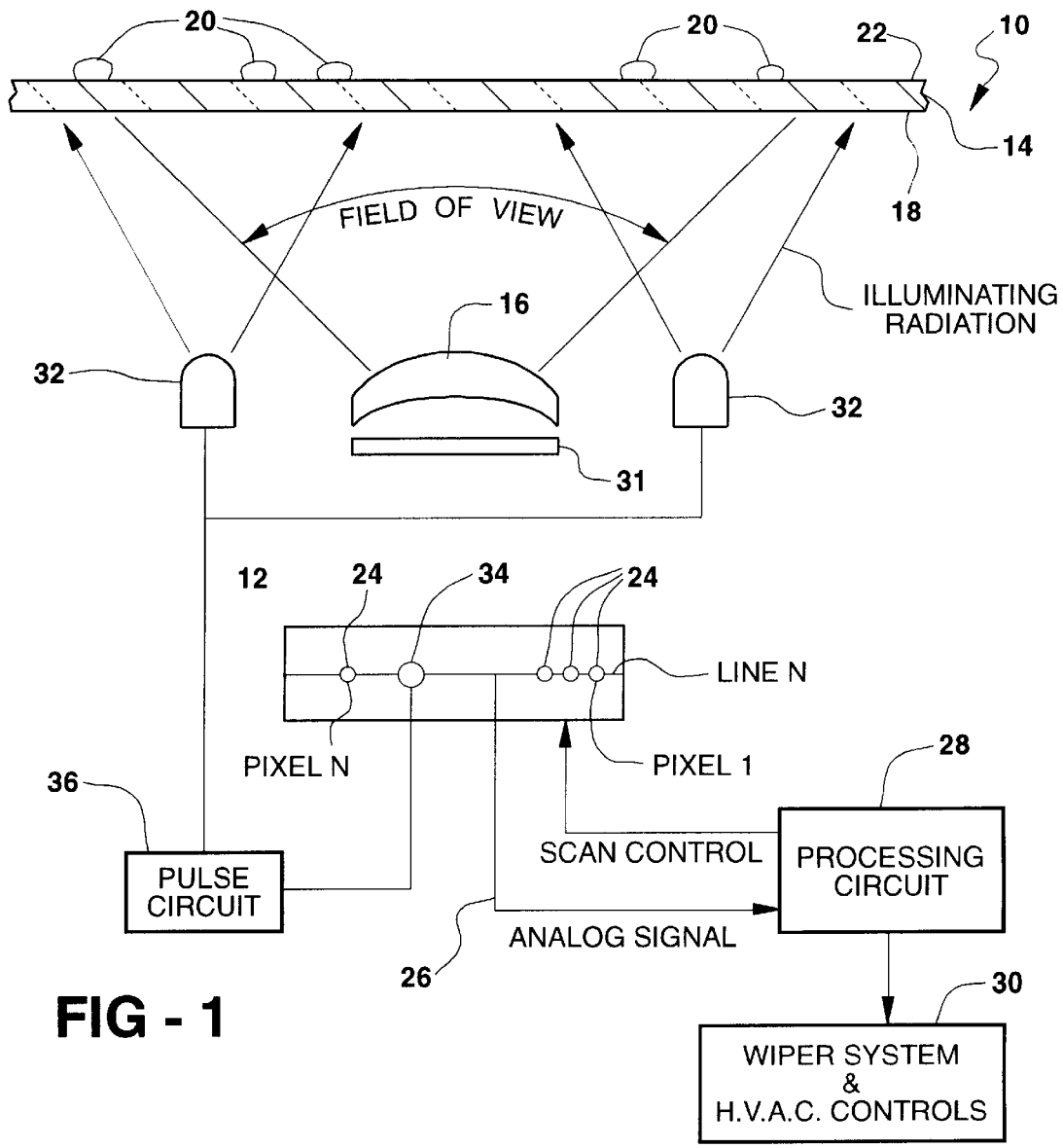
FIG. 1 is a schematic view of a preferred embodiment of the subject invention.

Referring to the Figures, wherein like numerals indicate like or corresponding parts throughout the several views, an assembly for sensing moisture on a glass surface from a position spaced from the glass is generally shown at 10 in FIG. 1. The assembly 10 includes, inter alia, a focal plane detector 12 adapted for disposition in spaced relationship to the interior surface 18 of a sheet of glass 14. The sheet of glass 14 is the windshield of an automotive vehicle. An imaging lens 16 is adapted for disposition between the focal plane detector 12 and the interior surface 18 of the sheet of glass 14 for directing light rays from moisture 20 on the exterior surface 22 of the sheet of glass 14 through the imaging lens 16 to produce a real image of the moisture 20 on the focal plane detector 12.

The focal plane detector 12 comprises a plurality of photosensitive detectors or pixels 24 for dividing the real image into a plurality of elements and for producing an analog signal 26 corresponding to each of the elements. An example of a focal plane detector which may be employed in the subject invention is part of a Vision VV5300 integrated CMOS camera.

The new generation of focal plane detector arrays are fully integrated into complete CCD or CMOS cameras. That is, the photosensors matrix is part of the neonolithic integrated circuit which includes the analog to digital converter and ancilary processing circuitry (28). Critical timing functions are also generally provided by such integrated cameras.

An image control and digital processing circuit 28 is included for establishing a steady-state level of the analog signals 26 representing a non-moisture 20 condition of the exterior surface 22 of the glass 14 and for scanning the analog signals 26 digitizing those signals and using pre-established algorithms to produce a wiper signal 30 in response to a deviation from the steady-state level. The non-moisture condition may, of course, be a condition where an minimal amount or an acceptable amount of moisture remains on the windshield. The wiper signal 30 is a generic signal supplied to the wiper control and defrost or defog interface circuit which, in turn, sends a signal to the wiper drive system and/or the heater, vent and air conditioning controls. In addition, the processing circuit 28 changes the steady-state level in response to permanent changes in the non-moisture 20 condition of the exterior surface 22 of the glass 14. For example, the glass may become permanently scratched and alter repeated indications of the new scratched condition the processing circuit 28 changes the threshold or steady-state level. Also this threshold change may be accomplished digitally.

Ambient light can be used to illuminate the water droplets by transmissive means. Naturally ambient light can only be used in the daytime, and other provisions for lighting the water droplets on the windshield would be used at night. In the absence of adequate natural illumination, auxiliary transmissive light could be provided by small lamps or light emitting diodes mounted to the exterior of the vehicle. Of course these could not be distracting to the driver, and would advantageously be limited to infrared emission. The near I.R. is usually well within the sensitivity range of photo detectors and is generally transmitted by the windshield. The tendency of such externally mounted auxiliary emitters to be obscured by dirt or snow suggests that in-vehicle mounting may be far more practical. In fact, experiments with I.R. emitting diodes indicate that continuous illumination with near I.R. in retro reflective mode may be preferable to transillumination or a hybrid system. Exclusion of ambient light does confer some benefit in that the large, typical, variation in ambient light which tends to saturate the photo detector (imager) is mostly eliminated. Low cost light emitting diodes (LEDs) operating at 880 nm (nanometers) or even 940 nm can be used singly or in an array to effectively illuminate the desired area of the windshield. Naturally, a narrow band filter 31 could be used to allow only the illuminating wavelengths to pass through to the detector 12, greatly improving the signal to noise ratio of the system. Pulsed LEDs operating at frequencies ranging from tens of Hz to kHz may be used to improve discrimination of the illumination signal from ambient light. The preferred assembly, therefore, includes a light source 32 adapted for disposition in spaced relationship to the interior surface 18 of the sheet of glass 14 for directing light to the exterior surface 22 of the glass 14 whereby light rays generated by the light source 32 are directed from moisture 20 on the exterior surface 22 of the sheet of glass 14 through the imaging lens 16 to produce the real image of the moisture 20 on the focal plane detector 12. In the preferred embodiment, the light source 32 comprises one or more light emitting diodes (LED). In addition, there is included an ambient light sensor 34 for sensing a predetermined level of ambient light for illuminating the LEDs 32 in response to the ambient light being below the predetermined level. The light sensor 34 includes a pulse circuit 36 for pulsing the light emitting diodes 32.

Illuminating radiation is derived from the I.R. light emitting diodes 32 that may be disposed around the imaging lens 16. These illumination sources are configured to prevent direct reflection of energy off the interior or exterior surface of the windshield 14. That is, the lens 16 of the imager should be prevented from imaging the illuminating source onto the detector array 12.

Most CMOS and CCD imagers have a dynamic illumination range of at least 40 dB (4 decades) and perform with a useful ratio in most outdoor applications. Average ambient daylight illumination of 10 K lux drops to 100 lux at dusk, necessitating the addition of suitable optical energy within the spectral bandpass of the imager. In order to prevent annoying and perhaps dangerous distractions to the driver at night, the auxiliary light source should be essentially invisible to the driver. The spectral response of most commercial CMOS and CCD imagers extends to approximately 1 micron in the near infrared and to 360 nm in the near ultraviolet. While it appears that either the near U.V. or I.R. would be suitable sources of humanly imperceptible illumination for the rain sensing imager, the special optical characteristics of standard windshield glass preclude the U.V. approach altogether. Virtually all modern windshields exhibit a very sharp attenuation of wavelengths shorter than 400 nm in the near U.V. and a more gradual attenuation of wavelengths greater than 780 nm. In fact, in an attempt to minimize solar heating of automotive interiors, newer metallic multi-layer glazing materials exhibit transmission of less than 15% above 850 nm. The problem is to adequately illuminate rain drops 20 on the outside of the glass 14 with a light source 32 inside the glass. The double pass loss of energy at the common I.R. LED wavelength of 880 nm can be expected to be in excess 75% with standard tinted windshields and over 95% with commonly used I.R. filter glazing.

Since the vast majority of automotive windshields provide nominally 25% doublepass transmission of 880 nm radiation, the preferred auxiliary illumination means is an LED array operated as needed, to supplement naturally occurring ambient light as required. While the auxiliary illuminator 32 may be used continuously, the preferred embodiment of the present invention would energize the LED array only as needed to supplement naturally occurring ambient light. Solar heating of the LED I.R. illuminator 32 seriously degrades its performance, and self generated heat during normal operation causes further diminution in output. In order to mitigate such degradation, an illuminator excitation signal could be derived from the imager or from a separate light sensing detector 34, to turn on the LED array 32 only as needed.

The I.R. illuminator array 32 may be preferentially positioned around the imaging optic 16 for the imaging array 12, so that essentially coaxial illumination would be provided. Naturally, the effective illumination angle provided by such an LED array 32 would be such as to cover the entire object field, i.e., windshield, covered by the imaging optic 16. As noted, the illuminator array 32 may be operated in continuous or pulsed mode in order to maximize the ratio of the system. Synchronous pulse mode operation 36 may be used to provide higher peak output flux without having to resort to an excessive number of LEDs or large heat sinks. Of course such pulsed operation 36 would have to accommodate the imager framing cycle, and light pulses would have to be long enough to properly illuminate all of the pixels 24 in a given scan.

Alternative auxiliary illumination means are also usable, and these could include filtered incandescent lamps, fluorescent tubes, or pulsed discharge lamps, i.e., strobes. In all cases however, the visible output from such lamps would be attenuated by the use of filters and/or louvers to minimize interference with driver vision, especially at night. Note that the location of the auxiliary illumination means 32 need not be coincident with the imager or camera 12, and it may be placed at any other location that optimizes image contrast while minimizing direct reflection from the inner windshield surface 18.

In one particularly successful embodiment of the auxiliary illuminator, thirty two each, high output 780 nm I.R. LEDs were thermally coupled to an annular copper disk and aluminum heat sink that surrounded the image forming optic. a total of six Watts of electrical input power to the LED array allowed high contrast images of various size rain drops to be obtained from a medium resolution CMOS imager.

Figure 2:
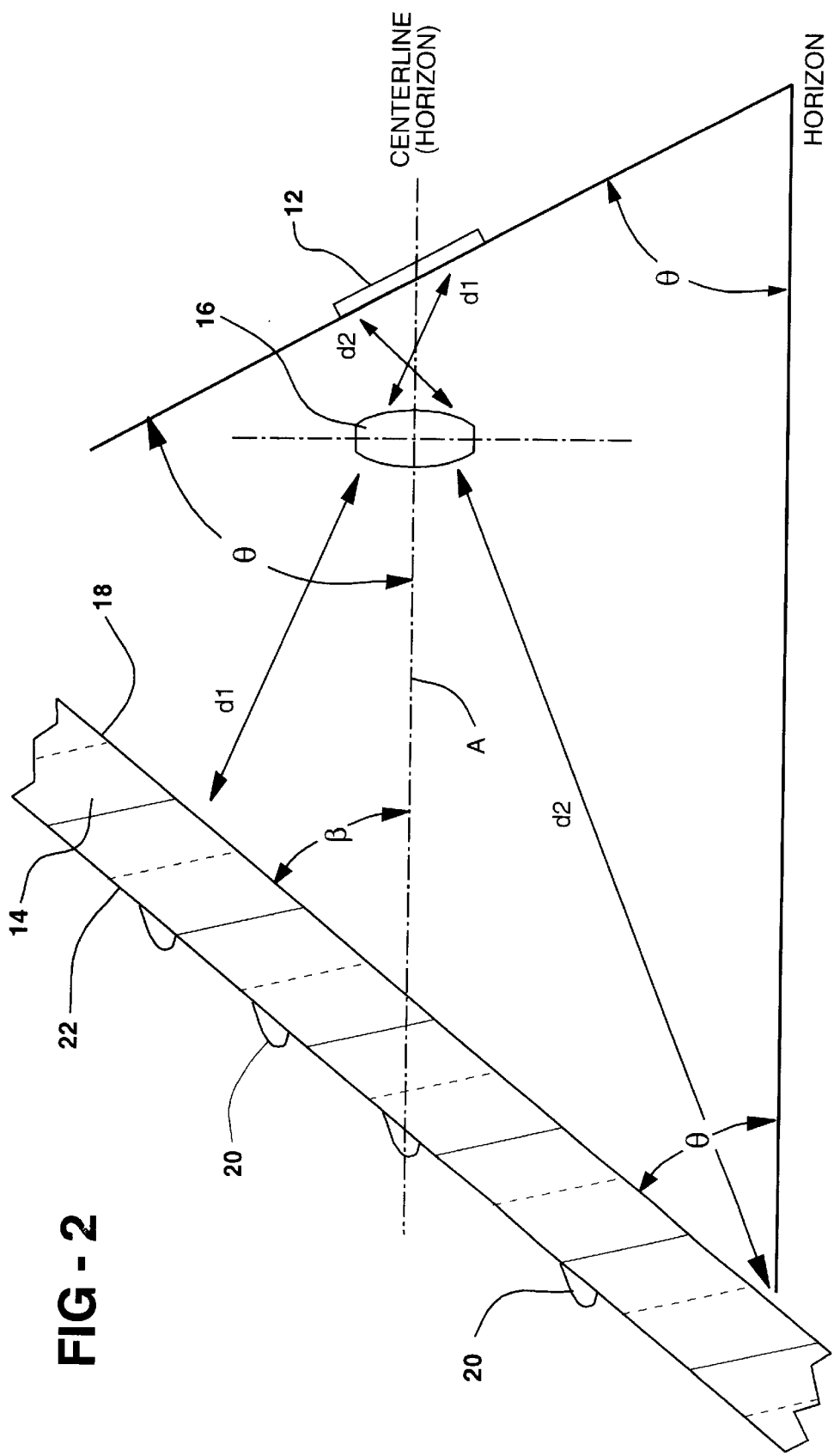
FIG. 2 is a schematic view of a species embodiment of the subject invention.

Normally, the lens 16, the focal plane detector 12 and the LEDs would be mounted on the forward side, i.e., windshield facing side, of the rearview mirror in an automobile. In so mounting, the lens 16 may be disposed at an acute angle $\Theta$ relative to the focal plane detector 12 for varying the magnification of the real image from one pixel 24 to another pixel 24. As illustrated in FIG. 2, the optical axis a of the lens 16 is positioned at an acute angle $\Theta$ relative to the plane of the focal plane detector 12 whereby the lens 16 may also be positioned at acute angle $\beta$ relative to the sheet of glass 14 to correct the image toward remaining in focus throughout the object field at the focal plane detector 12. Although, the image may not be perfectly in focus, because of the Scheimpflug principle the distortion caused by the slant angle $\beta$ will be compensated for by the acute angle $\Theta$ relationship between the lens 16 and the plane of the detector 12.

As will be appreciated from the description thus far, the invention also provides a novel method for sensing moisture 20 on the exterior surface 22 of a sheet of glass 14 comprising the steps of positioning an imaging lens 16 in spaced relationship to the interior surface 18 of the sheet of glass 14, passing light rays from moisture 20 on the exterior surface 22 of the sheet of glass 14 through the imaging lens 16 and producing a real image of the moisture 20 on the glass 14, and directing the real image from the lens 16 onto a focal plane detector 12.

The method includes the step of dividing the real image into a plurality of elements by positioning a pixel 24 to define each element, whereby each pixel 24 produces an analog signal 26 corresponding to each of the elements.

Figure 3:
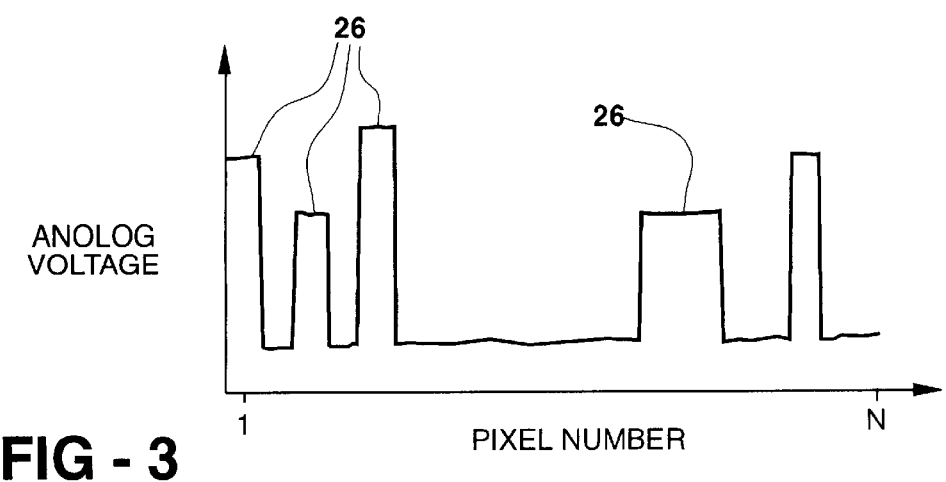
FIG. 3 is a graph of the analog signal produced by subject invention.

Also include is the steps of establishing a steady-state level of the analog signals 26 representing a non-moisture 20 condition of the exterior surface 22 of the glass 14, scanning the analog signals 26 and producing a wiper signal 30 in response to a deviation from the steady-state level, the change from the norm being the presence of moisture 20. In order to account for permanent changes to the exterior surface 22 of the sheet of glass 14, the method includes the step of changing the steady-state level in response to permanent changes in the non-moisture 20 condition of the exterior surface 22 of the glass 14, e.g., a scratch in the glass. FIG. 3 shows the analog voltage on the X or vertical axis and number of pixels on the Y or horizontal axis and the peak positions in the graph represent the moisture drops effect upon the light rays. The recovered signal, whether from a single line photosensor array 12, such as a CCD or MOS sensor, or from a two dimensional imaging array of similar construction, will contain analog information relating to the reflection by individual drops of the illumination source. That is, individual pixel or image elements 24 in the photo detector array will contain analog information corresponding to the brightness of certain parts of the image, which will be the retro-reflecting drops attached to the glass surface.

To further refine the method, it may include the steps of positioning a light source 32 in spaced relationship to the interior surface 18 of the sheet of glass 14, directing light from the source 32 to the exterior surface 22 of the glass 14 whereby the light rays generated by the light source 32 are passed through the lens 16 to create the real image. However, the real image may be created from light rays generated by ambient light in response to ambient light being above a predetermined level, i.e., daytime, and created by light rays generated by the light source 32 in response to ambient light being below the predetermined level, i.e., nighttime.

As suggested, the method may include the refined step of producing a real image of the moisture 20 by varying the magnification of the real image from one pixel 24 to another pixel 24 a further refinement is the step of positioning the optical axis a of the lens 16 at an acute angle β relative to the sheet of glass 14 and positioning the focal plane detector 12 at acute angle Θ relative to the optical axis a of the lens 16, whereby the lens 16 is at an acute angle relative to both the sheet of glass 14 and the focal plane detector 12, whereby the image tends to remain in focus throughout the object field at the focal plane detector 12.

The method scans the analog signals 26 produced by the pixels 24 analyzes the data 28, and produces a wiper signal 30 in response to a predetermined change in the analog signals 26.

The rain drops or droplets, which may range in size from tenths of millimeters to nearly ten millimeters in diameter, exhibit certain lens like and reflector like properties. Drops of water on a glass surface may act like the retro reflective glass beads that are commonly used on traffic signage and on beaded projection screens. These same drops may also act like small convex lenses to focus light or images onto an image plane spaced on or close to the glass surface. Non circular drops and rivulets of water also exhibit such optical properties, albeit without symmetry. The present invention utilizes these properties of water drops on a windshield to form an image of the light refracted or reflected by these drops onto an array 12 of photo detectors 24, in conjunction with one or more imaging optics or lens 16.

The ability of water drops to return a significant portion of light back in the general direction of the illumination source, as in the glass bead analog, permits a "synthetic eye" in the form of a multi element photo sensor 12 to view such drops with relatively high discrimination. That is, the ability of the water drops to generate a unique signature within the field of view allows for relatively unambiguous recognition and detection of the drops. This methodology is the inverse of that employed by extinction sensors where energy is coupled out of the glass by the water drops, reducing the amount of illumination energy returning to the photosensor. Unlike back-scatter rain sensors, the present invention does not integrate the light returning from mist or droplets that collect on the outer surface of the windshield. Instead, a real optical image, constructed of individual image elements or pixels representing the light reflected or refracted by drops on the glass surface 22, is projected onto the surface of the photo detector array 12 by a lens 16. As the size of the water droplets decreases past the resolving power of the imaging optics 16 and the sensor array 12, a natural integration of individual image elements will occur and the sensor system will act similar to a conventional back-scatter detector, but with a image generating lens 16. Note that while it is natural to assume that such a machine vision systems mimic human sight, in fact it may be advantageous to use asymmetrical imaging optics such as cylinder lenses to essentially "smear" the image in one axis. Such techniques allow the use of less costly line imagers rather than two dimensional arrays. For improved imaging versatility two such line imagers may be used orthogonally to generate the greatest amount of information from the field of view.

Human factors experiments have empirically concluded that certain water droplet (raindrop) sizes induce drivers to operate their wipers at different times. That is, the amount of water collected on the windshield that will cause the driver to operate the wiper is a function of droplet size and distribution. a fine, evenly distributed mist might not require wiping while a widely scattered dispersion of large drops might necessitate clearing because the larger drops might interfere with the driver's vision. In order to provide the capacity to detect such widely spaced drops, one needs to monitor relatively large areas of the windshield, while still being able to detect much smaller droplets, i.e., mist, with the same optical system. In actual practice, it has been determined that a viewing area as measured on the windshield of approximately 12 square inches (7750 square mm) is desirable for adequate large drop sensitivity.

The resolution of the imaging system must therefor be sufficient to sense the very small drops, while providing the necessary field of view over the specified area. Fortunately, low cost imaging arrays in both CCD or MOS construction offer resolutions of 320×240 pixels in a ⅓ in. imager which is approximately 6.5 mm×4.8 mm in size. As an example, a 3 in.×4 in. sensing area on the glass which would correspond to approximately 100 mm×77 mm, when coupled with an imaging lens of approximately 50 degrees field of view, and used with the imager noted above, would yield a droplet resolution of 0.3 mm or approximately 0.010 in. Of course, the retro-reflected light image from such small drops might be, in fact be smaller than the drop itself and may need to be slightly diffused to artificially occupy at least one pixel. Larger drops would naturally be more easily detected as their light images would bridge several pixels.

The imaging optics project a real image of the reflection of the drops appearing within the field of view on the windshield onto a multi-element photo detector array 12. Such arrays 12 are commonly called imagers, and may be either linear, i.e., line scan, or two dimensional in construction. The imager shown is a two dimensional device, but only one line of pixels 24 is being interrogated, for simplicity, and in this instance behaves like a single line sensor. Light or I.R. energy reflected preferentially by individual water drops is collected by the imaging lens 16 which forms an image of these "light spots" on the surface of the imager array 12. Image size or magnification is governed by standard optical equations that relate the object size to the image size as a function of lens focal length and object distance. The image is inverted as in common camera practice, and the depth of field is a function of lens aperture and object distance, i.e., for a given focal length.

The necessary resolution of the focal plane imaging array 12 in an off the glass rain sensor is determined by various factors, such as the active area of the imager (CMOS or CCD array), the angle of view of the optics 16, and the requisite minimum resolvable object size in the field of view. While the calculations are elementary, an example will serve to illustrate the difficulty in achieving a satisfactory level of rain sensing performance with commercially available components. Typical, low cost imagers with 100,000 addressable pixels (nominally 320×320 elements) can resolve 0.02 mm at the image plane, which is limited to about a 5 mm diameter image circle. Given a desired object circle of nominally 100 mm diameter, a linear optical reduction of 20:1 is required, thereby providing (under ideal conditions) a minimum resolvable object of 0.02 mm×20=0.4 mm. Unfortunately, the smallest rain drops that need to be sensed are 0.2 mm diameter and under a wide range of lighting conditions. Clearly, either the field of view needs to be compromised, such as being reduced four fold, or the number of pixels 24 at the imager plane need to be increased significantly, which a significant and unacceptable increase in cost.

The present invention addresses the problem of the required, relatively high optical resolution, while maintaining a wide field of view, and while using a relatively low resolution imaging or focal plane array 12 by employing special optical means. Two methods for solving the rain drop resolution problem are presented:

1. Differential magnification optics employing astigmatic lens elements.
2. Differential magnification optics employing the 'Scheimpflug' principle.

In the first case, an optical system consisting of either refractive, i.e., lens, or reflective, i.e., mirror, elements is designed to form a real image of a portion of the windshield on the focal plane array 12. This optical system is constructed so that the power or effective focal length of the optic 16 is variable over its field of view. In perhaps the simplest configuration, the imaging lens 16 could provide a 2:1 focal length range in two axes, in much the same way prescription glasses correct for astigmatism. If for example, these axes were orthogonal, the field of view in one axis would be twice that of the second axis, providing a two fold increase in magnification in one axis only. Naturally, the image projected onto the focal plane array 12 would be distorted, but it is important to realize that the imaging rain sensor constitutes a form of machine vision and is not required to produce images of good or even moderate fidelity. In fact, the image produced by the focal plane array need not be recognizable in any conventional manner, as long as the image processing electronics 28 can discern the desired image characteristics. The imaging optic 16 could be designed to provide a continuously variable or step-wise magnification, of the object field in order to produce a selective magnification over at least part of the windshield surface. Such differential magnification will permit a relatively low resolution imager to detect rain drops which might otherwise be too small to sense. Since small drops are generally uniformly dispersed over the glass surface, only a relatively small portion of the image field need be highly magnified, thereby retaining the desired wide field of view for the system.

In the second case, a normally troubling aspect of off the glass rain sensing in a vehicle is used to advantage. It is well known that most automotive windshields 14 are mounted at relatively large rake angles $\phi$ order to minimize wind resistance. In fact, the glass mounting angle $\phi$ may be as small as 20–28 degrees with respect to horizontal, making camera observation of the glass surface rather tricky. The reason that optical imaging is difficult in the case of sloping windshields is that the imager 12 (camera) and lens axis a is ideally angled somewhat below the horizontal plane in order to minimize direct sun effects. The very high luminous intensity of the sun can damage most imaging arrays if the sun is focused onto the detector, particularly by a high gain, low f number, optical system. Simple geometric optics will show that at reasonably close mounting distances from the windshield (typically 50–100 mm) the upper edge of the glass will be much closer to the lens of the system than the lower edge of the windshield glass. Even with moderately wide angle optics (2.5–4 mm f.l.) any reasonably fast optic (f/1.5 to f/2.8) will exhibit a very limited depth of field at the necessary working distances. In other words, when the optics are focused on one part of the windshield, other parts of the windshield (actually the water drops on the outer surface of the windshield) will not be in focus. Paradoxically, the very shallow depth of field is highly desirable to minimize sensitivity to non rain artifacts, while the sloping object plane must to be in focus over the entire field of view in order to maximize image contrast and enhance rain drop detection.

The present invention, in the embodiment illustrated in FIG. 2, utilizes the sloping windshield 14 and essentially horizontal imager or optical lens axis a to elicit a highly desirable effect, to wit, a variable magnification over a portion of the field of view. This effect is achieved by employing the Scheimpflug principle, which is old and well known, e.g., British Patent 1196, Jan. 16, 1904, and common to view camera practice. The application of the Scheimpflug rule to off the glass as shown in FIG. 2, imaging rain sensors closely follows standard camera methods, where the image plane 12 is tilted with respect to the lens plane or the optical lens axis a. Further, the object plane, i.e., windshield 14, intersects with the image plane 12 and the optical lens axis a at one point as specified by the Scheimpflug principle. In effect, the portion of the object plane, or drops 20 on the windshield 14, which is closest to the lens 16 is magnified much more on the image plane 12 than are portions of the object plane further away from the lens 16, yet all drops 20 on the windshield 14 are in focus. In actual practice, a ⅓ in.

imager equipped with a 2.5 mm f.1., 150 degree field of view lens, mounted approximately 50 mm from the center of the object plane yields an effective 5× magnification differential over the entire object field. Of course, the field of view is highly distorted and essentially trapezoidal in shape with the horizontal f.o.v, restricted to nominally 40 mm (1.6 in.) at the top of the frame and 200 mm (8 in.) at the bottom of the frame. Droplets 20 smaller than 0.1 mm can easily be resolved in this manner, albeit in a limited area of the field of view. The obvious advantage of this application of the Scheimpflug rule is that the troublesome sloping object plane, i.e., windshield, is used in conjunction with an angled imager 12 to maintain focus throughout the object field. Furthermore, the use of the Scheimpflug principle provides a differential magnification within the image field, allowing very small droplets to be detected, while maintaining a relatively wide field of view to detect large, widely scattered droplets. Unlike the differential magnification afforded by special astigmatic or multi-focal optics, the Scheimpflug adaptation permits standard or low cost commercial lenses to be used in a very simple, convenient manner to achieve essentially the same result.

As the individual pixels 24 in the given line of photo detectors are addressed, the relative analog level for each pixel is examined as shown in the analog level graph of FIG. 3. Scanning is accomplished by either external timing means 28 or by self scanning of the imager using onboard facilities, i.e., the vehicle computer or microprocessor. a microprocessor would be used to analyze the resulting signal stream after it has been digitized. General purpose image analysis software or specific programs designed for rain sensing may be used to extract the most meaningful or useful information acquired from the photo sensing array 12. For example, ambient lighting conditions can be essentially disregarded and only the differential signals relating to individual droplet reflections need to be considered. Also, certain reflection parameters can be used to characterize the nature of the material that has collected on the windshield, such as raindrops, ice, mist or fog on the inside 18 of the windshield 14. Whenever given criteria are met, the software can decide whether to initiate wiper action, defrost or defog cycles. Various degrees of sophistication may be designed into the software that will allow the system to be self testing and self calibrating. Permanent scratches or cracks or semi permanent artifacts, such as droppings, on the glass, which plague current systems, could be disregarded by such "smart sensor" topologies.

As noted earlier, an imaging system need not be designed with a coherent imaging lens. That is, the lens 16 may be designed to constructively distort the image to elicit particular information about the subject, i.e., drops on the windshield. In the case of rain sensing, the lens system 16 may consist of one or more cylinder lenses that "smear" the light spot images of the individual drops over several pixels 24. That is, instead of forming images corresponding to the multiple spots in the field of view, the image would consist of light streaks. Various cylindrical lens elements with different focal lengths could be used to provide the necessary magnification without substantially reducing the field of view. The resulting image would actually be a collage of image elements, that corresponded to various parts of the object field.

The imaging lens 16 depicted in the relevant figures is shown as a refractive or transmissive element, but it should be understood that a reflective or mirror imaging optic may be used instead of a traditional lens, or in combination with a refractive element. Such "mirror lenses" are well known in photography, and offer certain cost-performance benefits.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method for sensing moisture (20) on the exterior surface (22) of a sheet of glass (14) comprising the steps of;
   positioning an imaging lens (16) in spaced relationship to the interior surface (18) of the sheet of glass (14),
   focusing light with moisture (20) on the exterior surface (22) of the sheet of glass (14) into a concentrated light image,
   passing light rays concentrated from moisture (20) on the exterior surface (22) of the sheet of glass (14) through the imaging lens (16) and producing a real image of a bright spot of concentrated light from the moisture (20) on the glass (14), and
   directing the real image of concentrated light from the lens (16) onto a focal plane detector (12).

2. A method as set forth in claim 1 including dividing the real image into a plurality of elements and producing an analog signal (26) corresponding to each of the elements.

3. A method as set forth in claim 2 including establishing a steady-state level of the analog signals (26) representing a non-moisture (20) condition of the exterior surface (22) of the glass (14), scanning the analog signals (26) digitally processing the data (28) and producing a wiper signal (30) in response to a deviation from the steady-state level.

4. A method as set forth in claim 3 including changing the steady-state level in response to permanent changes in the non-moisture (20) condition of the exterior surface (22) of the glass (14).

5. A method as set forth in claim 3 including positioning a light source (32) in spaced relationship to the interior surface (18) of the sheet of glass (14), directing light from the source to the exterior surface (22) of the glass (14), and wherein the step of passing of light rays is further defined as passing light rays generated by the light source (32).

6. A method as set forth in claim 5 wherein the step of passing of light rays is further defined as passing light rays generated by ambient light in response to ambient light being above a predetermined level and passing light rays generated by the light source (32) in response to ambient light being below the predetermined level.

7. A method as set forth in claim 3 wherein the step of producing a real image of the moisture (20) is further defined as varying the magnification of the real image from one element to another element.

8. A method as set forth in claim 1 further defined as positioning the lens (16) at an acute angle relative to the sheet of glass (14) and positioning the focal plane detector (12) at acute angle relative to both of the sheet of glass (14) and the lens (16) whereby the image tends to remain in focus throughout the object field at the focal plane detector (12).

9. A method as set forth in claim 2 wherein the step of dividing the real image into a plurality of elements is further defined as positioning a pixel to define each element whereby each pixel produces an analog signal (26).

10. A method as set forth in claim 9 including scanning the analog signals (26) produced by the pixels (24) digitally processing the data (28) and producing a wiper signal (30) in response to a predetermined change in the analog signals (26).

11. An assembly for sensing moisture (20) on a glass (14) surface from a position spaced from the glass (14), said assembly comprising;
   a focal plane detector (12) adapted for disposition in spaced relationship to the interior surface (18) of the sheet of glass (14), and
   an imaging lens (16) adapted for disposition between said focal plane detector (12) and the interior surface (18) of the sheet of glass (14) for directing light rays focused into concentrated light from moisture (20) on the exterior surface (22) of the sheet of glass (14) through said imaging lens (16) to produce a real image of a bright spot of concentrated light the moisture (20) on said focal plane detector (12).

12. An assembly as set forth in claim 11 wherein said focal plane detector (12) comprises a plurality of pixels (24) for dividing the real image into a plurality of elements and for producing an analog signal (26) corresponding to each of the elements.

13. An assembly as set forth in claim 12 including a digital processing circuit (28) for establishing a steady-state level of the analog signals (26) representing a non-moisture (20) condition of the exterior surface (22) of the glass (14) and for scanning the analog signals (26) to produce a wiper signal (30) in response to a deviation from the steady-state level.

14. An assembly as set forth in claim 12 including a digital processing circuit (28) for establishing a steady-state level of the analog signals (26) representing a non-moisture (20) condition of the exterior surface (22) of the glass (14) and for scanning the analog signals (26) to produce a wiper signal (30) in response to a deviation from the steady-state level and for changing the steady-state level in response to permanent changes in the non-moisture (20) condition of the exterior surface (22) of the glass (14).

15. An assembly as set forth in claim 11 including a light source (32) adapted for disposition in spaced relationship to the interior surface (18) of the sheet of glass (14) for directing light to the exterior surface (22) of the glass (14) whereby light rays generated by the light source (32) are directed from moisture (20) on the exterior surface (22) of the sheet of glass (14) through said imaging lens (16) to produce the real image of the moisture (20) on said focal plane detector (12).

16. An assembly as set forth in claim 15 including an ambient light sensor (34) for sensing a predetermined level of ambient light for illuminating said light source (32) in response to said ambient light being below said predetermined level.

17. An assembly as set forth in claim 16 wherein said light comprises light emitting diodes and including a pulse circuit (36) for pulsing said light emitting diodes.

18. An assembly as set forth in claim 11 wherein said lens (16) is disposed relative to said focal plane detector (12) for varying the magnification of the real image from one pixel to another pixel.

19. An assembly as set forth in claim 11 wherein said lens (16) is positioned at an acute angle relative to said focal plane detector (12) whereby said lens (16) may be positioned at acute angle relative to both of the sheet of glass (14) and said lens (16) to correct the image toward remaining in focus throughout the object field at the focal plane detector (12).

* * * * *